UNITED STATES PATENT OFFICE.

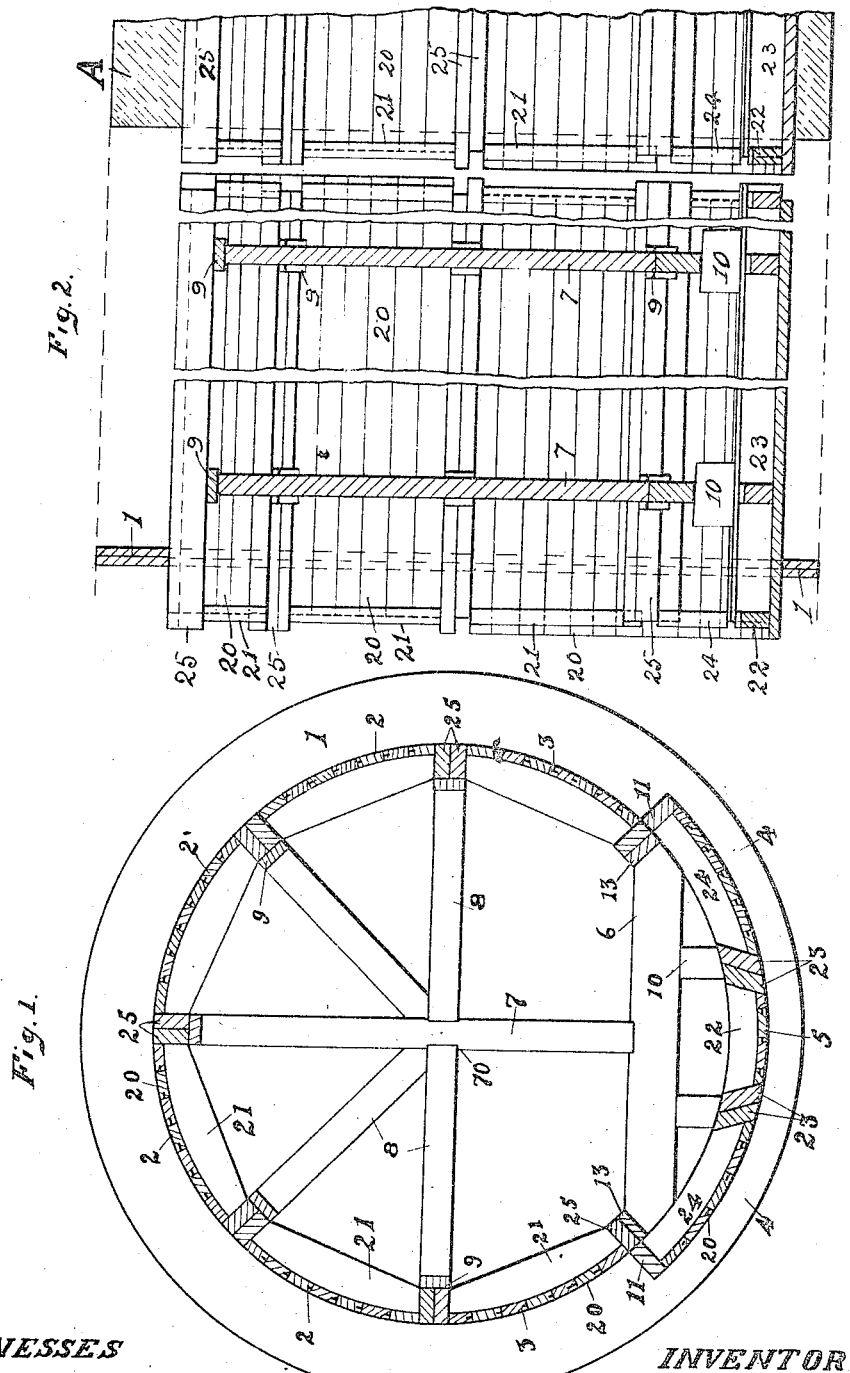

HENRY W. BASSETT, OF SEATTLE, WASHINGTON.

FORM FOR MOLDED CONDUITS.

990,417.  Specification of Letters Patent.  Patented Apr. 25, 1911.

Application filed March 18, 1910. Serial No. 550,247.

*To all whom it may concern:*

Be it known that I, HENRY W. BASSETT, a citizen of the United States, and resident of the city of Seattle, in the county of King and State of Washington, have invented certain new and useful Improvements in Forms for Molded Conduits, of which the following is a specification.

My invention relates to an improvement in forms for molded conduits, and comprises the novel parts and combinations of parts which will be hereinafter described and particularly described in the claims.

The object of my invention is to provide a form or mold which may be used to shape the inner surfaces of conduits which are made of such materials as cement, concrete etc., which may be molded to forms and then allowed to set, the specific objects being to improve and simplify both the construction and method of using such devices so as to make them more convenient and economical, as well as better.

In the drawings I have shown my invention in a form which is preferred by me.

Figure 1 is a cross section of a complete mold in position for use. Fig. 2 is a longitudinal section showing a new section slightly separated from the previous section which has been completed and the conduit molded.

My invention is more particularly applicable to molding conduits of some size and under conditions where the conduit is accessible from the top, for instance in making a sewer or other pipe in an open cut. For the best use of my device the size of the conduit should be such as to permit passage of workmen therethrough, so as to remove the inner lining and to set up the new sections.

The particular form of mold shown is designed to make a sewer conduit which, when fully completed, is to have a segment at the bottom lined with vitrified brick, and therefore, the molded section thereof shows a recessed segment of a depth to receive a layer of brick.

The outline of the conduit which I have shown to illustrate my invention, is circular, although it will be understood that it may be modified so as to be used to mold conduits of other transverse outline.

In Fig. 2 will be seen, at the right, the end, A, of the body of a section of conduit which has just been molded. The material which will be assumed to have been used is concrete, although any other material may be used which is of similar character, in respect at least, as to its adaptability to being molded to shape. In fact, some of the features of my invention may be used with advantage in building conduits out of brick or like materials of block form which are laid up as masonry.

The forms which outline the inner surface of the conduit consist of a series of segments, 2, 3, 4 and 5, each segment consisting of an outer skin 20 composed of boards, longitudinal ribs, 25, and transverse ribs 21. The sections 2 and 3 are alike in construction, but differ in the manner in which they are placed when in use.

Two sections 4 and one section 5, are used in forming the part which is to receive the brick lining. The outer sections 4 have their outer edges radial, but their inner edges, as outlined by the longitudinal ribs 23, are sloping from a radius, the angle of inclination being such as to make the outer angle at this edge considerably less than a right angle. The material point is that the opposing surfaces of the segments 4 be somewhat farther apart at their upper edges than at their lower edges. The central section 5, has its side ribs 23, similarly inclined so that this segment acts as an inverted keystone, or one which may be removed from the concave side of the arch.

The various segments which outline the form are held in place at one end by engagement with the segments which have been used in molding the last section of the conduits, and at the other end they are held in place by a ring or templet 1, which is in the form of a ring or flange extending radially and about the whole. This ring acts as a restraining member to keep the segments in place when forced outward, and also to determine their exact position. It also acts as a wall to determine the end surface of the section being molded.

In setting the form up for a new section of conduit, the ring 1 is accurately placed, then the lower segments 4 and 5 are put in place. Transverse beams or sills 6, are placed upon the transverse ribs 24, of the outer segments 4. The segments 3, 3, are placed in position and then the upper segments 2, these being held in place by placing the interior bracing consisting of the central vertical posts 7, and the radial bars 8, which extend from the center of the conduit outward, one at each point of juncture between the segments 2 and 3.

The central posts 7 are preferably cut so as to form recesses 70, on two opposite sides, adapted to receive the ends of the horizontal bars 8 and support their inner ends. The other short bars 8 rest upon the horizontal bars and between these horizontal bars and the vertical post 7. The central post 7 rests upon the transverse sill 6. The sill 6 is cut inclined at its ends, one side to fit the transverse ribs 24 of the segments 4, and the other side radially to fit the edge of the segments 3.

The position of the segments 3 and 4 is such that the segments 4 are wholly outside of, that is, farther from the center, than the segments 3, so that the segments 3 may, under certain conditions, slide over or overlap the segments 4. This occurs when first setting up the segments 2 and 3. Also the post 7 and bars 8 are cut somewhat shorter than is needed to hold the segments out against the ring or templet 1.

After the segments 2 and 3 have been put in position, wedges 13 are driven between the ends of the sills 6 and the edges of the segments 3, expanding the segments outward against the ring 1. At the same time wedges 9 are driven between the bars 8 and the ribs 25 to force the segments outward against the ring 1, thus holding the whole structure firmly in exact position. Blocks 10 are also placed between the sills 6 and the lower or invert segments 4 and 5, thus holding these securely in exact position.

The restraining member or ring 1, where it is desired to form a conduit with a lining recess, has its inner outline offset at the margins of the lined section, as at the points 11, this offset being of the depth of the lining to be inserted. The segments 4 and 5 which form this lined section, or the invert as herein shown, are made to fit closely against this offset, the inner segment 5 being shaped as a keystone insertible and removable from the interior. The depth of this offset is that of the thickness of the lining to be inserted.

An inspection of Fig. 2 will show that the outer skin or lagging of the segments projects beyond the transverse ribs 21, 22 and 24, at one end of the segments, and that the transverse ribs project beyond the outer skin or lagging at the other end of the segments. These segments are so placed that when set up, the ends of the segments forming the new section will overlap those of the section just completed, in such a way as to resist displacement while setting up and while placing the material of the wall, at least until the interior bracing has been placed. In some cases the outer skin of the segments of the new section will be outside the transverse ribs of the segments of the preceding section, and in some cases this condition will be reversed. Also, the ends of the longitudinal ribs project half the thickness of the transverse ribs at one end and terminate at the center line of the transverse ribs at the other end, whereby the ends of the segments of adjoining sections interlock to secure exact registry and to prevent peripheral displacement. The segments of the completed section of conduit thus support and exactly locate the segments which are set up for the molding of a new section. The other ends of the segments are located and held by the encircling band or restraining member 1, which forms the end wall of the space to be filled with the conduit material.

After a conduit section has been molded, the bars 7 and 8 and the wedges used between these bars and the segments to key the latter out against the ring 1, are removed and used to set up another section. The encircling ring 1 is also moved ahead the length of a section and used to locate and hold the segments for the next section. The segments themselves are left within the conduit a sufficient length of time to permit the conduit walls to set sufficiently, and are then taken down and removed. This method of forming the mold and using it, secures rapid and accurate work and also cheapness both in the construction of the molds and in their operation. After the concrete has been set sufficiently to warrant removal of the segments of the mold, these may be removed and the lining to be given in the invert may be put in place as soon as convenient. This part of the work may be done in this way much more cheaply than by incorporating it in the wall at the time the concrete is set.

What I claim and desire to patent is;

1. An inner form for molded conduits comprising longitudinal segments adapted to outline the invert, other longitudinal segments adapted to outline the remainder of the conduit, a restraining band adapted to surround and locate said segments and having its inner edge recessed to hold the invert segments farther from the center than the segments adjoining to permit the edges of the latter moving peripherally within the invert segments, and means for peripherally expanding those segments above the invert.

2. An inner form for molded conduits comprising a series of segments adapted to be assembled to act as an arch and outline the bore of the conduit, the segments of adjacent sections having complemental projections and recesses adapted to interlock to prevent displacement both radially and peripherally, a templet or rib adapted to surround the outer ends of the segments of a section to restrain them against outward movement, and also to form an end wall for the mold.

3. An inner form for molded conduits, comprising a series of longitudinal segments adapted, when assembled, to outline the bore of the conduit, the ends of said segments having complemental projections and recesses formed by the relative positions of their outer skin and ribs, and adapted to engage to prevent displacement of the segments of adjacent sections both in a radial and peripheral direction, a templet or partition surrounding the outer ends of the segments of the section and having its opening conforming to that of the bore of the conduit, said templet serving as a restraining band to prevent outward movement of the segments, and also to form a partition wall for the outer end of the wall section being molded, and braces adapted to engage the inner surface of the segments to hold them out against said templet.

4. An inner form for molded conduits comprising segments adapted to be assembled to act as an arch, said segments having longitudinal and transverse ribs, and an outer skin, the transverse ribs at the ends of the segments being offset relative to the outer skin to interlock against displacement radially at the junction of adjacent sections, and the ends of the longitudinal ribs being offset relative to the transverse ribs to interlock to prevent displacement peripherally between adjacent sections.

5. An inner form for molded conduits, comprising longitudinal segments composed of outer lagging and ribs secured thereto, said ribs including transverse ribs at each end, the transverse rib at one end projecting beyond the ends of the lagging and at the other end the lagging extending beyond the rib, whereby interlocking engagement between segments may be obtained, said segments also having longitudinal ribs at their side edges adapted to engage those of adjacent segments to form an arch, an independent, radially extending rib surrounding the outer ends of the segments and acting as a restraining band and a temporary end wall for the mold section, and means for expanding the segments peripherally against this band.

6. An inner form for molded conduits, comprising segments adapted to outline the invert, one of said segments being removable inwardly, another set of segments adapted to outline the remainder of the conduit, a restraining member surrounding the segments and having an off-set outline at the edges of the invert section, whereby the adjacent segments may slide one over the other, transverse sills spanning the invert segments and serving as an abutment for the other segments, and means for keying the segments outwardly from said sills against the restraining member.

7. An inner form for molded conduits, comprising segments adapted to outline the invert, one of said segments being removable inwardly, another set of segments adapted to outline that portion of the conduit above the invert, a restraining member surrounding the segments and having an off-set outline at the edges of the invert section, whereby the segments at each side may slide, one over the other, transverse sills spanning the invert segments and serving as abutments for the upper segments, means for keying said upper segments outward from said sills, and posts braced against each other and the segments at their meeting edges to hold them more securely against the restraining member.

In testimony whereof I have hereunto affixed my signature at Seattle, Washington, 8 March, 1910.

HENRY W. BASSETT.

Witnesses:
 HENRY L. REYNOLDS,
 GORDON E. MACMILLAN.